(12) United States Patent
Jensen et al.

(10) Patent No.: US 6,389,331 B1
(45) Date of Patent: May 14, 2002

(54) TECHNIQUE FOR MONITORING PERFORMANCE OF A FACILITY MANAGEMENT SYSTEM

(75) Inventors: Howard A. Jensen, Mequon; John E. Seem, Glendale, both of WI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/266,667

(22) Filed: Mar. 11, 1999

(51) Int. Cl.$^7$ ............................................... G05B 23/00
(52) U.S. Cl. ........................ 700/275; 700/83; 700/276; 700/79; 702/182
(58) Field of Search ............................... 700/2, 3, 9, 10, 700/83, 275, 276, 277, 286, 19, 79; 709/224, 226; 345/969, 965; 236/49.5; 62/93, 126; 702/182–186, 188

(56) References Cited

U.S. PATENT DOCUMENTS 5,675,739 A * 10/1997 Eilert et al. ................. 709/226
5,682,329 A * 10/1997 Seem et al. ................. 700/276
5,958,012 A * 9/1999 Battat et al. ................ 709/224

* cited by examiner

Primary Examiner—William Grant
Assistant Examiner—Steven R. Garland
(74) Attorney, Agent, or Firm—Foley & Lardner

(57) ABSTRACT

A facilities management system is subdivided into a plurality of subsystems. The performance of the system is monitored by producing data which denotes a plurality of operational parameters for each of the subsystems. From that data, a global performance index is derived for each subsystem, thus providing an indication of each subsystem's performance. The global performance indices are employed to produce a universal performance index for the entire facilities management system. This provides a hierarchy of data which enables an operator to quickly determine the overall performance of the facilities management system and each subsystem, and if warranted the operator can step through the data to identify malfunctioning components.

17 Claims, 2 Drawing Sheets

TECHNIQUE FOR MONITORING PERFORMANCE OF A FACILITY MANAGEMENT SYSTEM

BACKGROUND OF THE INVENTION

The present invention relates to networks for managing systems of a building, such as systems which provide heating, ventilation, air conditioning, fire detection, and building access and security; and more particularly to techniques by which the performance of components on the network are monitored.

Large commercial and institutional buildings have several systems for controlling different aspects of the building operation. A heating, ventilation and air conditioning (HVAC) system manages components which control the interior environment of the building. Electrical management systems control the lights and other electrical loads within the building for optimum energy conservation. A security system comprises devices which limit access to the facility to only individuals who possess a proper access code or access device, such as a key card. A fire detection system utilizes heat and smoke detectors located throughout the building to sense the occurrence of a fire and produce a warning of that event.

The components of each of these systems typically are networked together so that the entire building may be controlled from workstations at one or more locations. Such workstations may be located at the manager's office, the building operating engineer's office and the security desk. A given building may be part of a larger commercial or educational campus in which case the systems and networks for each building can be connected to a wide area communication network, which enables control from a central campus facility management office.

When a component fails, the system provides a alarm indication of that failure at the workstations. However, it is desirable for the operator to be alerted beforehand of an impending failure. This enables preventative action to be taken. However, the components on the network within a typical building produce so much operational information, it is difficult even for an experienced operator to evaluate the overall performance of the system to detect potential problems. It also is too time consuming to inspect the operating status of every component on the network to pin point ones approaching a malfunction.

This monitoring difficulty is magnified when multiple buildings of a campus are being supervised from a central location.

SUMMARY OF THE INVENTION

A general object of the present invention is to provide a technique for monitoring performance of a facility management system and indicating that performance to a human operator.

Another object is to provide a hierarchy of indices which characterize the performance of different levels of the facility management system.

A further object of the present invention is to provide a set of indices which characterize the overall performance of the entire facility management system.

Yet another object is to provide a different set of indices which characterize performance of each subsystem in the facility management system.

A still further object of the present invention is to provide data representing the various operational parameters of the subsystems which enable an operator to pin point functional deficiencies before a catastrophic condition occurs.

These and other objectives are satisfied by a method in which the facilities management system is subdivided into a plurality of subsystems. Data is produced which denotes a plurality of operational parameters for each subsystem. A global performance index for each subsystem is derived from the current values of its operational parameters. From those global performance indices for the subsystems, a universal performance index is derived for entire facilities management system.

In the preferred implementation of this method, the operational parameter data is normalized so that the data for every parameter fall with in the same range of values. The data for each operational parameter also may be averaged separately over a given period of time to minimize the effects that a momentary aberration has on the data. A weighted averaging technique may be employed in which the data occurring at a given point in time is given more importance that data occurring at other times. Preferably the global performance index for each subsystem is derived by performing a weighted averaging on the parameter data. Similarly the universal performance index is derived by averaging the global indices.

DETAILED DESCRIPTION OF THE INVENTION

Figure 1:
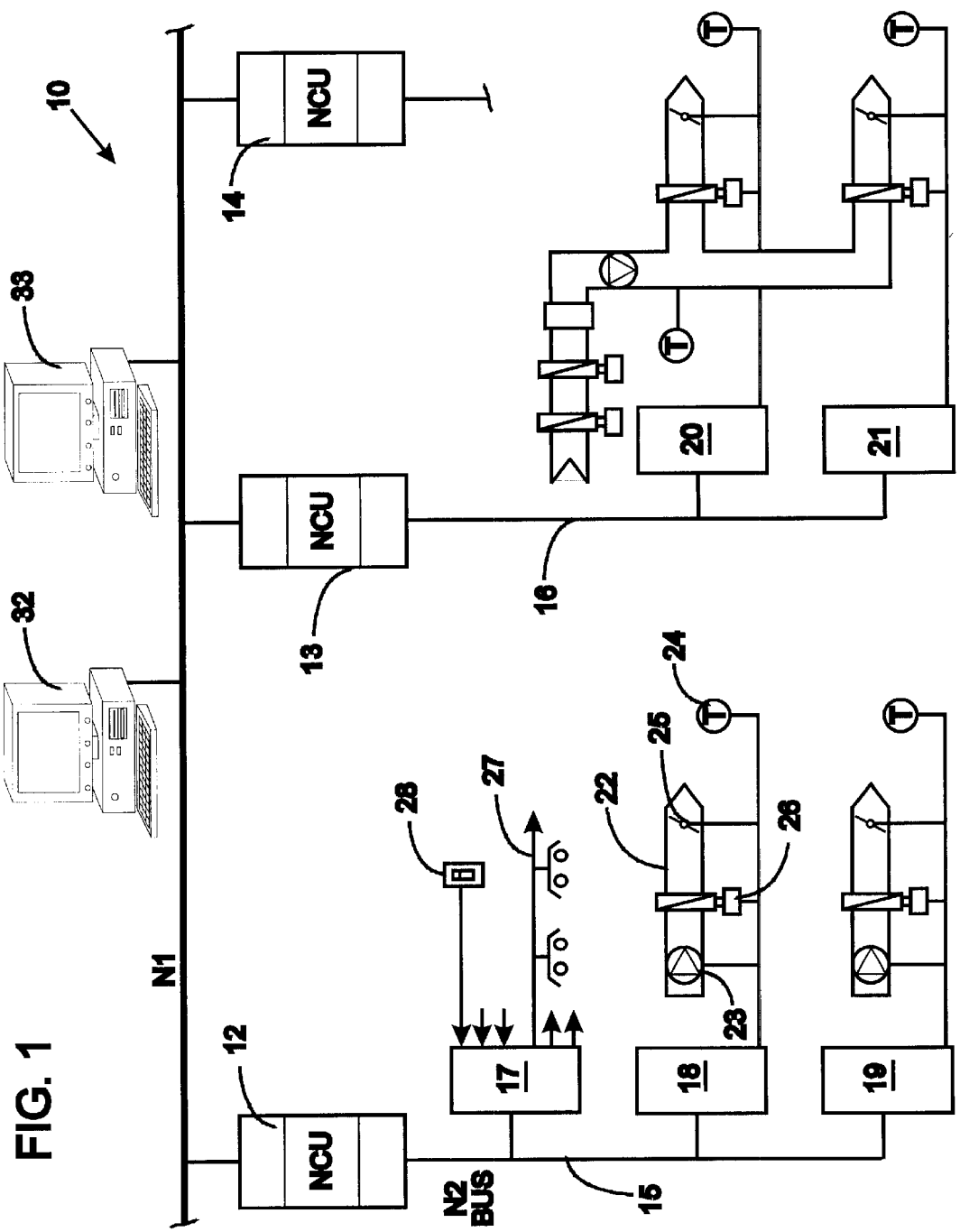
FIG. 1 is a block diagram of an exemplary facility management system for controlling heating, ventilation, air conditioning and lighting within a building.

FIG. 1 illustrates an example of a facility management system 10, such as one implemented using a Metasy® control system manufactured by Johnson Controls, Inc. of Milwaukee, Wis., USA. This type of control system is described in detail in U.S. Pat. No. 5,511,188, which description is incorporated herein by reference. The facilities management system (FMS) 10 controls environmental systems, such as HVAC and lighting within a building. Building security and fire detection systems also can be included.

The facilities management system 10 is subdivided into a plurality of subsystems to which the various environmental control equipment are assigned. Each subsystem is supervised by a network control unit 12, 13 or 14 connected to a high speed digital communication network N1. The network control unit (NCU) is a high-level supervisory controller which provides centralized monitoring of alarms, historical data collection and global control functions such as point-sharing and building-wide interlocks. Although the exemplary facility management system 10 has three network control units, it is common for a building to have a significantly greater number of subsystems.

The network control units 12–14 execute specialized programs to maintain the environmental conditions governed by their respective subsystems according to programmed parameters. Numerous background tasks are performed by the network control units 12–14 to ensure that each of the nodes of the N1 network is operating with the same set of global variables, is time synchronized, and has consistent directories of system names and configuration data. The network control units 12–14 also execute user defined programs that enable the building managers to monitor the operation of the system.

Operation of the environmental control equipment is governed by digital control modules 17, 18, 19, 20 and 21 which are connected to one of the network control units 12 or 13 by an N2 bus 15 or 16, respectively. The digital control modules 17–21 interface with sensors, actuators and other components of the respective equipment. Depending upon the type of equipment being controlled, the digital control modules 17–21 may receive signals from pressure/electric transducers, binary input contacts, differential pressure inputs and binary frequency inputs. Typical actuators and outputs of the environmental control equipment include analog devices, solenoids, relays, motor controllers, indicator lights and annunciators.

In the exemplary facility management system 10, a first digital control module 17 operates lighting equipment within an area of the building. A plurality of light circuits 27 are connected to relay outputs of the digital control module 17, which also receives input signals from manual room light switches 28. The second digital control module 18 operates a conventional variable air volume (VAV) unit 22 of the building HVAC equipment and receives input signals from an airflow sensor 23 and a thermostat 24 within the room supplied by the VAV unit. In response to these input signals and control commands from the N2 bus, second digital control module 18 operates electrical actuators of a variable damper 25 and a chiller coil valve 26.

Two operator workstations 32 and 33, such as personal computers, are connected to the N1 network to communicate with the network control units 12, 13 and 14. Each of those workstations executes a supervisory control program which gathers status data regarding the operation of components of the facilities management system 10 and responds to user inputs by issuing commands that govern system operation. The primary workstation 32 also stores information regarding the configuration of the facilities management system 10 and operational data associated with each level of the system organization.

Although the exemplary facility management system 10 has three network control units 12–14, it is common for a building to have a significantly greater number of subsystems and thus a corresponding greater number of digital control modules and individual sensors and actuators. Therefore, a typical network has a very large collection of data representing the status of its equipment and subsystems. This makes it difficult for even an experienced operator to determine the overall performance of the facility management system at any given point in time, much less determine whether any part of the network is becoming overloaded.

To provide these indications, the network control units 12–14 gather data representing the performance of their subsystem and the collected data is employed to produce global indices of each network control unit's performance. One of the network control units (e.g. 12) tabulates the global indices into a set of universal indices representing performance of the entire facility management system 10.

Specifically each network control unit 12–14 keeps track of six operational parameters indicative of its performance and that of the subsystem connected to the associated N2 bus. These parameters are processor idle time, amount of free memory, amount of processor time devoted to executing user defined programs, number of messages received from the N1 network, number of messages sent via the N1 network, and utilization of the N2 bus.

Figure 2:
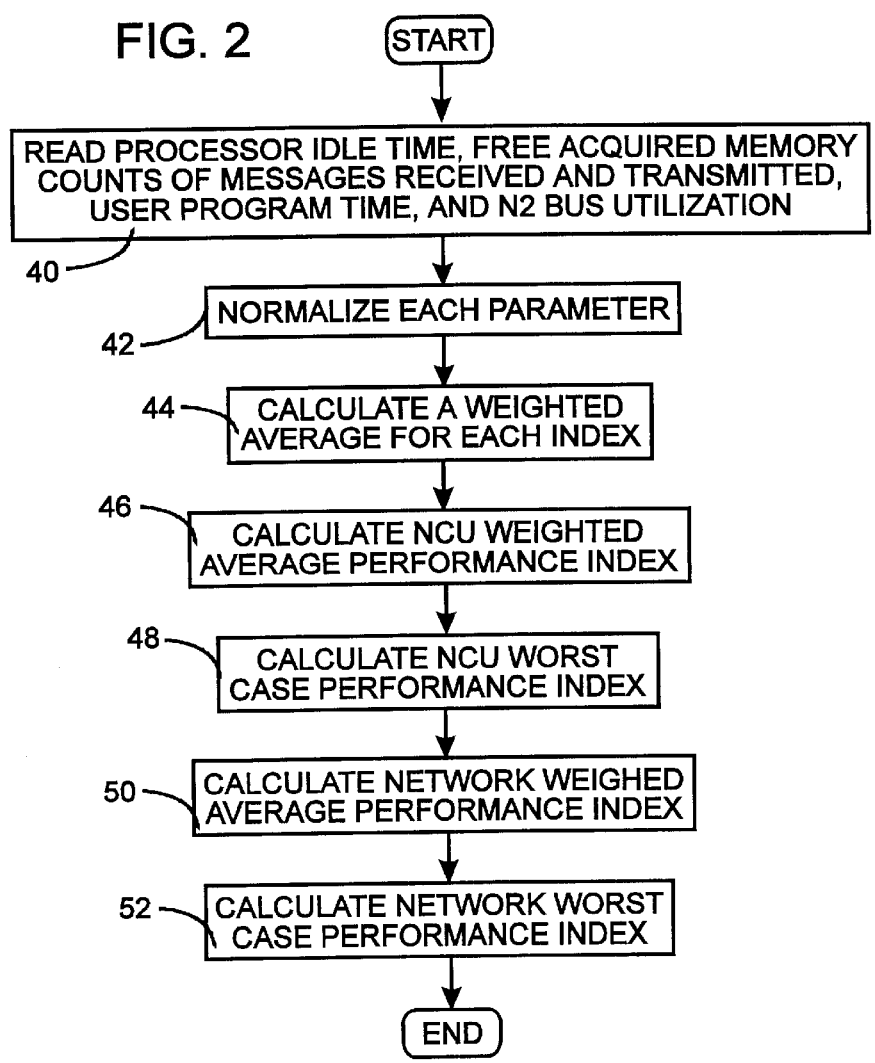
FIG. 2 is a flow chart of the technique for monitoring the performance of the facility management system.

As shown in the flowchart of FIG. 2, these parameter values are read by the NCU processors at step 40. In order that these different operational parameters may be combined into a single global indicator of the subsystem performance, the parameter values are normalized at step 42 to produce indices having values between zero and one, as will be described. A normalized index value of one indicates optimal performance, whereas a normalized index value of zero indicates subsystem failure.

The first operational parameter, processor idle time is the percentage of the time that the processor in the network control unit is not executing an instruction of one of its programs. During reoccurring intervals of time (e.g. five seconds), each network control unit measures the amount of time that its processor is idle and computes an idle time percentage. Ideally this percentage should be relatively large so that the processor generally will be available to execute an instruction when the activity on the N2 bus requires supervision by the network control unit. It has been determined empirically for a Metasy® control system that when the idle time reaches 30 percent or less, the NCU processor is becoming overloaded. The threshold value for other types of control systems may vary from this idle time percentage. When the idle time reaches zero, the processor is unable to execute all of the programs demanded of it and if there are any software coding errors the network control unit will reset automatically.

An automatic reset may be undesirable as several minutes may be required for the network control unit to re-establish control of the N2 bus subsystem, during which time control of the associated devices is lost. This may not be critical where the subsystem consists of HVAC components of a standard building. However, when HVAC equipment controls a critical environment, such as that or a clean room or a laboratory, the loss of environmental control for even a short time can have catastrophic or hazardous consequences. Therefore, it is desirable to have a warning that the NCU processor is operating at a near overload condition, so that remedial measures may be taken, such as reassigning some of the subsystem devices to other network control units.

Thus when the raw percentage of processor idle time is normalized to the zero to one value range, the normalized index (I) is set to one when the percentage of idle time is less than ten percent. This normalization is given by the expression:

$$I = \begin{cases} \dfrac{\text{Idle Time} - 10}{90} & \text{for Idle Time} \geq 10\% \\ 0 & \text{for Idle Time} < 10\% \end{cases}$$

Figure 3:
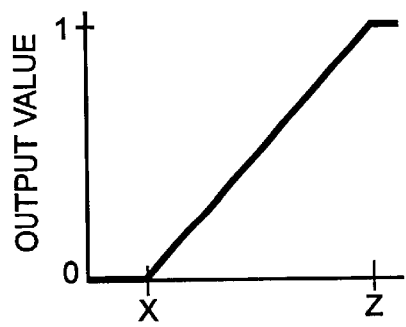
FIG. 3 is a graph of one function for normalizing data representing the performance of the facility management system.

When the idle time percentage is between ten and one hundred percent, the normalized idle time index (I) is greater than zero with a maximum value of one. This normalization function is depicted by the graph in FIG. 3 where X=10% and Z=100%.

An amount of memory in each network control unit has been set aside for the storage of data actively being used by the processor. This NCU memory section is referred to as the "acquired memory" and is used on a dynamic basis wherein the contents are erased from this memory space when the data no longer is needed for immediate processing. If long term retention of an item of data is required, the item will be transferred to another section of the NCU memory that has been defined for such retention. If the acquired memory fills up and space no longer is available for storage of incoming data, the network control unit automatically resets.

A second performance parameter is an amount of acquired memory that is "free", i.e. available for use. Each network control unit 12–14 periodically detects the amount of its acquired memory that is empty. For example, a typical network control unit may have 300 kilobytes (kB) of total acquired memory. Thus the amount of free memory is expressed in kilobytes ranging from 0 kB to 300 kB. The amount of free memory is normalized producing an index F according to the expression:

$$F = \begin{cases} \dfrac{\text{Free Memory} - 50}{250} & \text{for Free Memory} \geq 50 \text{ kB} \\ 0 & \text{for Free Memory} < 50 \text{ kB} \end{cases}$$

The normalized index F is clamped to zero when the amount of free memory drops below 50 kB and has a value greater than zero for amounts above 50 kB to a maximum normalized value of one when the entire 300 kB is available. This normalization function is depicted by the graph in FIG. 3 where X=50 kB and Z=300 kB.

The processor in a given network control unit 12–14 executes programs which control the operation of the subsystem associated with that network control unit. In addition the same network control unit can execute user defined programs which may analyze the operation of the subsystem or the entire facilities management system, for example. These user defined programs are written in a user programmable application language and consume processor time that otherwise would be available to operate of the building systems controlled by the network control unit.

A third system performance parameter is the amount of processor time that is being used by these user defined programs. During reoccurring intervals of time, such as the intervals used to measure processor idle time, each network control unit measures the amount of time that its processor has devoted to executing user defined programs and computes that amount as a percentage of time. Ideally this percentage should be relatively small so that the NCU processor will be free for building management tasks. An empirical determination for a Metasy® control system indicates that it is undesirable for user defined programs to consume twelve percent or more of the processor time. If the user defined programs run more than twelve percent of the time, the processor may not be available when needed to execute the building management programs which could result in an automatic reset of the network control unit. The threshold value for other types of control systems may be different.

The percentage of time for the user defined programs is normalized to produce a index U according to the expression:

$$U = \begin{cases} \dfrac{12 - \text{User Program Time}}{12} & \text{for User Program Time} < 12\% \\ 0 & \text{for User Program Time} \geq 12\% \end{cases}$$

Figure 4:
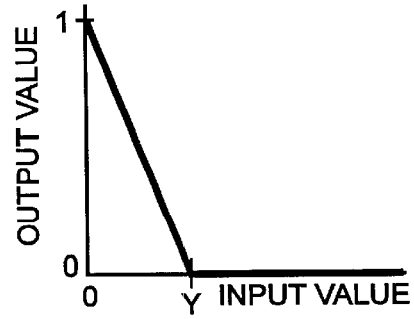
FIG. 4 is a graph of another function for normalizing other types of performance data.

This normalization function is depicted by the graph in FIG. 4 where Y=12%.

The utilization of the high speed digital communication network N1 by each network control unit 12–14 also provides an indication of the performance of that component and the associated subsystem. Therefore, during the reoccurring time periods, each network control unit counts the number of messages it receives from and sends over the N1 network. For one type of facilities management system 10, 500 messages received and 500 messages sent per minute has been determined empirically to be the maximum acceptable counts for a given network control unit. Message volume above these amounts indicates that the associated network control unit is operating at a capacity beyond that which is desirable for optimal performance. The message received and said counts are normalized to produce indices R and S especially using the expressions:

$$R = \begin{cases} \dfrac{500 - \text{MESSAGES RECEIVED}}{500} & \text{for MESSAGES RECEIVED} < 500 \\ 0 & \text{for MESSAGES RECEIVED} \geq 500 \end{cases}$$

These normalization functions are depicted by the graph in FIG. 4 where Y=500.

$$S = \begin{cases} \dfrac{500 - \text{MESSAGES SENT}}{500} & \text{for MESSAGES SENT} < 500 \\ 0 & \text{for MESSAGES SENT} \geq 500 \end{cases}$$

A final parameter is the utilization of each N2 bus which indicates the volume of subsystem activity. During the reoccurring period, the network control units 12–14 measure the percentage of time that their respective N2 bus is idle, i.e. not carrying a message. Other characteristics may be used as an indicator of N2 bus utilization. When the percentage that the N2 bus is idle is used, the raw percentage may be normalized to an index N according to the expression.

$$N = \begin{cases} \dfrac{80 - N2\ \text{UTILIZATION}}{80} & \text{for } N2\ \text{UTILIZATION} < 80\% \\ 0 & \text{for } N2\ \text{UTILIZATION} \geq 80\% \end{cases}$$

where 80 percent or greater utilization was considered as indicating excessive activity requiring remedial action. This normalization function is depicted by the graph in FIG. 4 where Y=80%. However, this threshold percentage may be different for other types of control networks.

The normalized indices I, F, U, R, S and N provide a snap-shot of the performance of the respective network control unit at a particular point in time. That snap-shot may not be representative of the actual performance as an aberration can affect the network only momentarily. As a consequence, rather than using instantaneous index values as indicators of the network control unit performance, an exponential moving weighted average (EWMA) is computed at step 44 for each index as more accurately depicting the performance over time. The EWMA's are derived by the expressions:

$$\tilde{I}_t = \tilde{I}_{t-T} + \lambda(I_t - \tilde{I}_{t-T})$$
$$\tilde{F}_t = \tilde{F}_{t-T} + \lambda(F_t - \tilde{F}_{t-T})$$
$$\tilde{U}_t = \tilde{U}_{t-T} + \lambda(U_t - \tilde{T}_{t-T})$$
$$\tilde{R}_t = \tilde{R}_{t-T} + \lambda(R_t - \tilde{R}_{t-T})$$
$$\tilde{S}_t = \tilde{S}_{t-T} + \lambda(S_t - \tilde{S}_{t-T})$$
$$\tilde{N}_t = \tilde{N}_{t-T} + \lambda(N_t - \tilde{N}_{t-T})$$

where $\tilde{I}_t$ is the EWMA of the normalized idle time at time t, $\tilde{I}_{t-T}$ is the EWMA of the normalized idle time at prior time t−T, λ is the exponential smoothing constant, $I_t$ is the normalized idle time at time t, $\tilde{F}_t$ is the EWMA of the normalized free memory at time t, $\tilde{F}_{t-T}$ is the FWMA of the normalized free memory at time t−T, λ is the exponential smoothing constant, $F_t$ is the normalized free memory at time t, $\tilde{U}_t$ is the EWMA of the normalized user program time at time t, $\tilde{U}_{t-T}$ is the EWMA of the normalized user program time at time t−T, $U_t$ is the normalized user program time at time t, $\tilde{R}_t$ is the EWMA of the normalized idle time at time t, $\tilde{R}_{t-T}$ is the EWMA of the normalized idle time at time t−T, $R_t$ is the normalized idle time at time t, $\tilde{S}_t$ is the EWMA of the normalized sent message count at time t, $\tilde{S}_{t-T}$ is the EWMA of the normalized sent message count at time t−T, $S_t$ is the normalized sent message count at time t, $\tilde{N}_t$ is the EWMA of the normalized N2 utilization at time t, $\tilde{N}_{t-T}$ is the EWMA of the normalized N2 utilization at time t−T, $N_t$ is the normalized N2 utilization at time t. The six resultant EWMA parameter values are stored in the network control unit.

Those six EWMA parameter values then are employed at step 46 to produce a global weighted average performance index $\overline{P}_t$ which represents the overall performance of the respective network control unit. This index is derived by the expression:

$$\overline{P}_t = \frac{w_1 \tilde{I}_t + w_2 \tilde{F}_t + w_3 \tilde{U}_t + w_4 \tilde{R}_t + w_5 \tilde{S}_t + w_6 \tilde{N}_t}{w_1 + w_2 + w_3 + w_4 + w_5 + w_6}$$

where the terms $w_1$, $w_2$, $w_3$, $w_4$, $w_5$ and $w_6$ are the weights assigned to each component parameter index. For example, the weights may be $w_1=5$, $w_2=3$, $w_3=2$, $w_4=2$, $w_5=2$ and $w_6=3$.

It also is useful to know the worst case performance for each network control unit as indicated by the normalized performance index I, F, U, R, S or N which has the worst, or minimum value. If during a given interval, n indices were produced for each parameter, then a global worst case performance index $W_{t,j}$ is produced at step 48 as depicted by the expression:

$$W_{t,j} = \min \begin{Bmatrix} I_t, I_{t-T}, I_{t-2T}, \ldots, I_{t-nT}; \\ F_t, F_{t-T}, F_{t-2T}, \ldots, F_{t-nT}; \\ U_t, U_{t-T}, U_{t-2T}, \ldots, U_{t-nT}; \\ R_t, R_{t-T}, R_{t-2T}, \ldots, R_{t-nT}; \\ S_t, S_{t-T}, S_{t-2T}, \ldots, S_{t-nT}; \\ N_t, N_{t-T}, I_{t-2T}, \ldots, I_{t-nT} \end{Bmatrix}$$

where j designates the particular network control unit 12–14.

At this point a set of parameter indices, a global weighted average performance index and a global worst case performance index have been produced for each network control unit 12–14 in the facility management system 10. These global indices now can be combined to produce a set of universal indices indicating the performance of the entire facility management system 10.

First a universal weighted average performance index $\Phi_t$ for the facility management system 10 is determined at step 50 according to:

$$\Phi_t = \frac{\sum_{i=1}^{N} \overline{P}_{t,i}}{N}$$

where N is the number of network control units in the system and $\overline{P}_{t,i}$ is the global weighted average performance value for network control unit i.

The universal worst case performance index $\Psi_t$ for the entire facility management system 10 at time t is determined at step 52 according to the expression:

$$\Psi_t = \min(W_{t,1}, W_{t,2}, \ldots, W_{t,j}, \ldots, W_{t,N-1}, W_{t,n})$$

where $W_{t,j}$ is the global worst case performance index for network control unit j at time t.

The operator of the facility management system 10 can access these universal indices via one of the work stations 32 or 33. By displaying the universal weighted average performance index $\Phi_t$ and the universal worst case performance index $\Psi_t$, the operator can quickly determine the overall operating performance of the system. If those universal indices denote a potential problem, the operator then can display the individual global indices that were employed to derive the universal index to determine which network controller is experiencing difficulty. The set of global indices and well and the individual parameter indices can be inspected to further pin point the cause of the problem.

If the building is part of a campus, the universal indices for each building can be combined in similar manners to produce indices depicting the performance of the entire campus.

What is claimed is:

1. A method for monitoring performance of a facilities management system, the method comprising steps of:
    (a) subdividing the facilities management system into a plurality of subsystems;
    (b) producing numerical data denoting status of a plurality of operational parameters for each of the plurality of subsystems;
    (c) normalizing the data to produce normalized data;
    (d) for a given one of the plurality of subsystems, averaging the normalized data acquired during a period of time for a given one of the plurality of operational parameters;
    (e) repeating step (d) for all of the plurality of operational parameters for the given one of the plurality of subsystems, thereby producing a plurality of averaged data;
    (f) repeating steps (d) and (e) for all of the plurality of subsystems;
    (g) arithmetically producing a separate global performance index for each of the plurality of subsystems from the plurality of averaged data, thereby producing global performance indices; and
    (h) deriving a universal performance index from the global performance indices, wherein the universal performance index qualitatively denotes performance of the facilities management system.

2. The method as recited in claim 1 wherein the step of averaging the normalized data comprises computing exponential moving weighted averages.

3. The method as recited in claim 2 wherein the exponential moving weighted average is computed according to the expression: $\tilde{P}t = \tilde{p}_{t-T} + \lambda(P_t - \tilde{P}_{t-T})$, where $\tilde{P}_t$ is an exponential moving weighted average of normalized data parameter P at time t, $\tilde{P}_{t-T}$ is an exponential moving weighted average of the normalized data item P at a prior time t−T, $\lambda$ is an exponential smoothing constant, and $P_t$ is a normalized data item at time t.

4. The method as recited in claim 1 wherein the step of arithmetically producing a global index selects a worst case data average for each of the plurality of subsystems.

5. The method as recited in claim 1 wherein the step of arithmetically producing a global index comprises for each of the plurality of subsystems averaging the averaged data.

6. The method as recited in claim 1 wherein the step of arithmetically producing a global index comprises for each of the plurality of subsystems computing a weighted average of the averaged data.

7. The method as recited in claim 6 wherein computing the weighted average $\overline{P}_t$ is computed according to the expression:

$$\overline{P}_t = \frac{w_1 \tilde{P}_{1,t} + w_2 \tilde{P}_{2,t} + \ldots + w_n \tilde{P}_{n,t}}{w_1 + w_2 + \ldots + w_n}$$

where the $\tilde{P}_{1,t}$ is the value of parameter $P_1$ at time t, $\tilde{P}_{2,t}$ is the value of parameter $P_2$ at time t, $\tilde{P}_{n,t}$ is the value of parameter $P_n$ at time t where n is an integer, and $w_1$, $w_2$, and $w_n$ are numerical values of weight assigned each parameter.

8. The method as recited in claim 1 wherein the step of deriving a universal performance index comprises selecting a worst case data average from among the plurality of subsystems.

9. The method as recited in claim 1 wherein the step of deriving a universal performance index comprises averaging the plurality of global indices.

10. A method for monitoring performance of a facilities management system, the method comprising steps of:

(a) subdividing the facilities management system into a plurality of subsystems;

(b) producing data denoting a plurality of operational parameters for each of the plurality of subsystems;

(c) deriving a global index from the data for the plurality of operational parameters for a given one of the plurality of subsystems, wherein the global index is a numerical value which qualitatively denotes performance of the given one of the plurality of subsystems;

(d) repeating step (c) for other ones of the plurality of subsystems to produce a plurality of global indices; and (e) deriving a universal performance index from the global indices, wherein the global index is a single variable which qualitatively denotes performance of the facilities management system.

11. The method as recited in claim 10 wherein the step of producing data comprises normalizing the data for each of the plurality of operational parameters.

12. The method as recited in claim 10 wherein the step of producing data comprises averaging data occurring during a period of time for each of the plurality of operational parameters.

13. The method as recited in claim 12 wherein the step of producing data comprises computing exponential moving weighted averages.

14. The method as recited in claim 12 wherein the step of producing a global index selects a worst case data average for each of the plurality of subsystems.

15. The method as recited in claim 10 wherein the step of deriving a global index comprises averaging the data denoting the plurality of operational parameters for the given one of the plurality of subsystems.

16. The method as recited in claim 15 wherein the step of deriving a universal performance index comprises selecting a worst case data average from among the plurality of subsystems.

17. The method as recited in claim 10 wherein the step of deriving a universal performance index comprises averaging the plurality of global indices.

\* \* \* \* \*